United States Patent
Dhankhar et al.

(10) Patent No.: US 10,997,291 B2
(45) Date of Patent: May 4, 2021

(54) EXTENDING DYNAMIC DETECTION OF MALWARE USING STATIC AND DYNAMIC MALWARE ANALYSES

(71) Applicant: Juniper Networks, Inc., Sunnyvale, CA (US)

(72) Inventors: Sudhir R. Dhankhar, Dublin, CA (US); Anoop Wilbur Saldanha, Bangalore (IN); Abhijit Mohanta, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 170 days.

(21) Appl. No.: 16/130,816

(22) Filed: Sep. 13, 2018

(65) Prior Publication Data
US 2020/0026851 A1 Jan. 23, 2020

(30) Foreign Application Priority Data
Jul. 19, 2018 (IN) .............................. 201841026993

(51) Int. Cl.
*G06F 21/55* (2013.01)
*G06F 21/56* (2013.01)
*G06F 21/53* (2013.01)

(52) U.S. Cl.
CPC ............ *G06F 21/554* (2013.01); *G06F 21/53* (2013.01); *G06F 21/562* (2013.01); *G06F 21/566* (2013.01); *G06F 21/568* (2013.01)

(58) Field of Classification Search
None
See application file for complete search history.

(56) References Cited

U.S. PATENT DOCUMENTS 9,917,855 B1 * 3/2018 Li ...................... G06F 21/566
2010/0180344 A1 * 7/2010 Malyshev ............... G06F 21/53
  726/23
2012/0254147 A1 * 10/2012 Bennett ............... G06F 16/9535
  707/706

(Continued)

OTHER PUBLICATIONS

Extended European Search Report for Application No. EP19165929.1, dated Nov. 7, 2019, 7 pages.

(Continued)

*Primary Examiner* — Henry Tsang
(74) *Attorney, Agent, or Firm* — Harrity & Harrity, LLP

(57) ABSTRACT

A device receives a software program, performs a dynamic malware analysis of the software program to generate dynamic malware analysis results, and generates a call graph based on the dynamic malware analysis of the software program. The device utilizes, during the dynamic malware analysis of the software program, the call graph to identify an exit of the software program and/or a forced kill of the software program, and performs a static malware analysis of the software program based on identifying the exit of the software program and/or the forced kill of the software program. The device generates static malware analysis results based on performing the static malware analysis of the software program, and combines the dynamic malware analysis results and the static malware analysis results to generate combined malware analysis results. The device performs one or more actions based on the combined malware analysis results.

20 Claims, 15 Drawing Sheets

(56) References Cited

U.S. PATENT DOCUMENTS

2013/0097706 A1    4/2013  Titonis et al.
2016/0359875 A1*  12/2016  Kim .................... H04L 63/1416
2018/0018459 A1*   1/2018  Zhang .................. G06F 21/554
2018/0025162 A1*   1/2018  Jin ...................... G06F 21/577
                                                                726/25

OTHER PUBLICATIONS

Kolbitsch C., et al., "The Power of Procrastination: Detection and Mitigation of Execution-Stalling Malicious Code," Proceedings of the 18th ACM Conference on Computer and Communications Security, Oct. 17, 2011, pp. 285-296. XP058006059.

* cited by examiner

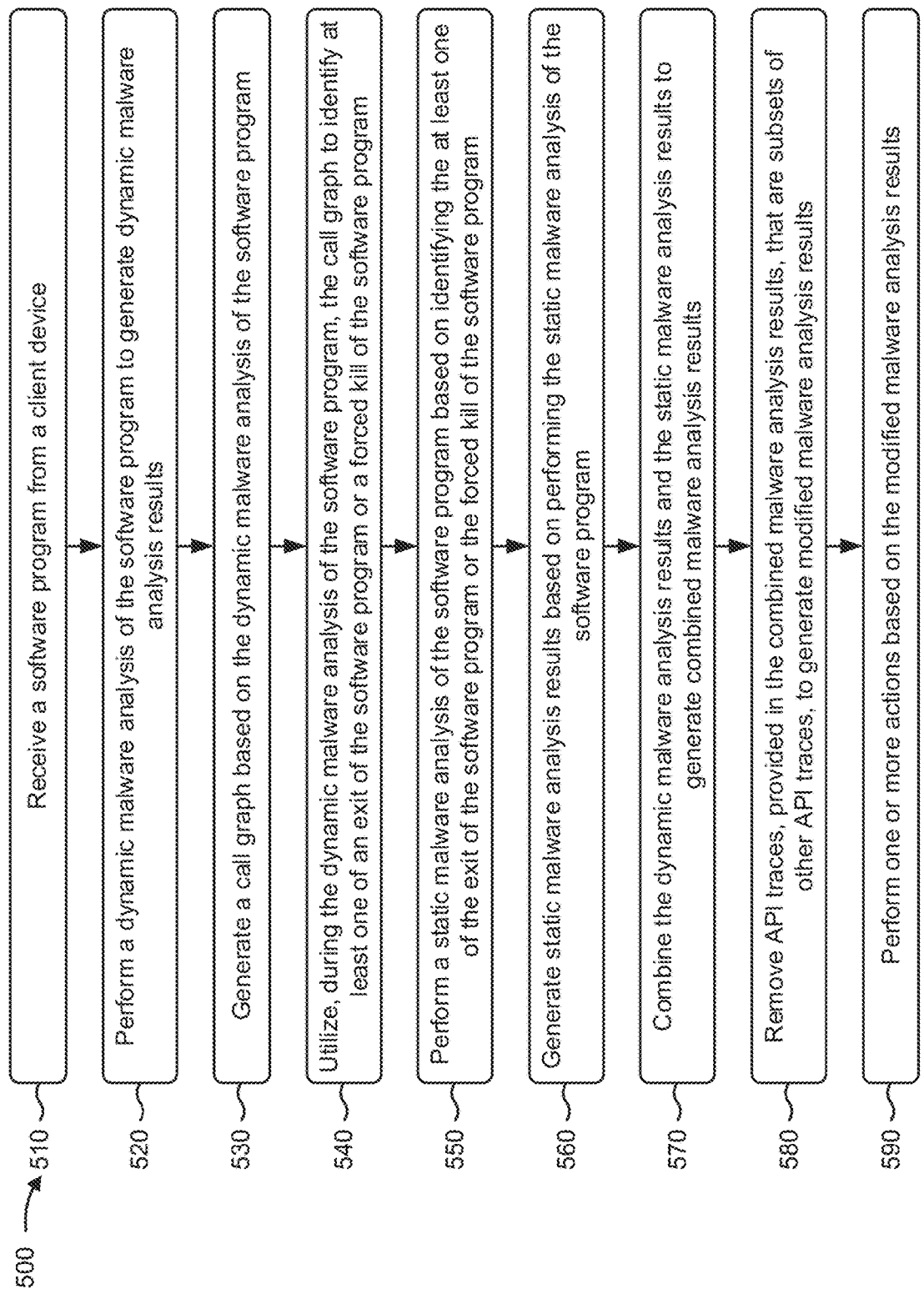

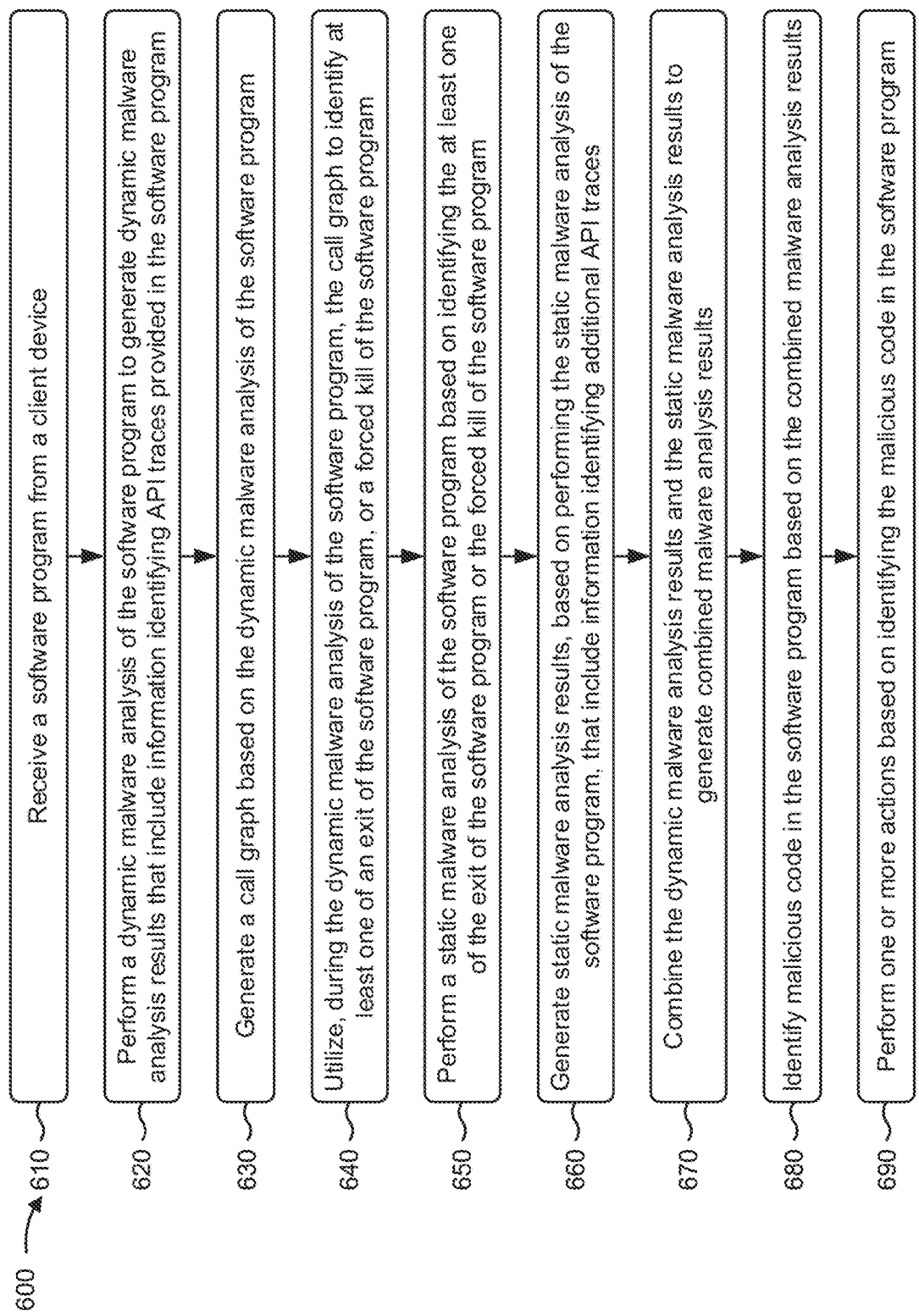

EXTENDING DYNAMIC DETECTION OF MALWARE USING STATIC AND DYNAMIC MALWARE ANALYSES

RELATED APPLICATION

This application claims priority under 35 U.S.C. § 119 to Indian Patent Application No. 201841026993, filed on Jul. 19, 2018, the content of which is incorporated by reference herein in its entirety.

BACKGROUND

A software program (e.g., a binary software program) executed inside a sandbox may identify all application programming interfaces (APIs) used by the software program if the software program does not exhibit armoring during execution. Logging API traces used by a software program is important to understand the behavior of the software program and to help determine whether the software program is malicious (e.g., is malware or includes malware). However, malware uses different kinds of armoring to prevent dynamic malware analysis of a software program in a sandbox, which prevents logging of the API traces. For example, malware may detect that the software program is executing within a sandbox and may exit the software program to prevent identification of API traces indicating malicious behavior.

SUMMARY

According to some implementations, a method may include receiving a software program from a client device, and providing the software program to a sandbox. The method may include performing, via the sandbox, a dynamic malware analysis of the software program to generate dynamic malware analysis results, and generating a call graph based on the dynamic malware analysis of the software program. The method may include utilizing, during the dynamic malware analysis of the software program, the call graph to identify at least one of an exit of the software program or a forced kill of the software program, and performing, via the sandbox, a static malware analysis of the software program based on identifying the at least one of the exit of the software program or the forced kill of the software program. The method may include generating static malware analysis results based on performing the static malware analysis of the software program, and combining the dynamic malware analysis results and the static malware analysis results to generate combined malware analysis results. The method may include performing one or more actions based on the combined malware analysis results.

According to some implementations, a device may include one or more memories, and one or more processors to receive a software program from a client device, and perform a dynamic malware analysis of the software program to generate dynamic malware analysis results. The one or more processors may generate a call graph based on the dynamic malware analysis of the software program, and may utilize, during the dynamic malware analysis of the software program, the call graph to identify at least one of an exit of the software program or a forced kill of the software program. The one or more processors may perform a static malware analysis of the software program based on identifying the at least one of the exit of the software program or the forced kill of the software program, and may generate static malware analysis results based on performing the static malware analysis of the software program. The one or more processors may combine the dynamic malware analysis results and the static malware analysis results to generate combined malware analysis results, and may remove application programming interface (API) traces, provided in the combined malware analysis results, that are subsets of other API traces provided in the combined malware analysis results, wherein modified malware analysis results may be generated based on removing the API traces that are subsets of other traces from the combined malware analysis results. The one or more processors may perform one or more actions based on the modified malware analysis results.

According to some implementations, a non-transitory computer-readable medium may store instructions that include one or more instructions that, when executed by one or more processors of a device, cause the one or more processors to receive a software program from a client device, and perform a dynamic malware analysis of the software program to generate dynamic malware analysis results, wherein the dynamic malware analysis results include information identifying one or more application programming interface (API) traces provided in the software program. The one or more instructions may cause the one or more processors to generate a call graph based on the dynamic malware analysis of the software program, and utilize, during the dynamic malware analysis of the software program, the call graph to identify at least one of an exit of the software program or a forced kill of the software program. The one or more instructions may cause the one or more processors to perform a static malware analysis of the software program based on identifying the at least one of the exit of the software program or the forced kill of the software program, and generate static malware analysis results based on performing the static malware analysis of the software program, wherein the static malware analysis results include information identifying one or more additional API traces provided in the software program. The one or more instructions may cause the one or more processors to combine the dynamic malware analysis results and the static malware analysis results to generate combined malware analysis results, and identify malicious code in the software program based on the combined malware analysis results. The one or more instructions may cause the one or more processors to perform one or more actions based on identifying the malicious code in the software program.

BRIEF DESCRIPTION OF THE DRAWINGS

FIGS. 4-6 are flow charts of example processes for extending dynamic detection of malware using static and dynamic malware analyses.

DETAILED DESCRIPTION

Figure 1A:
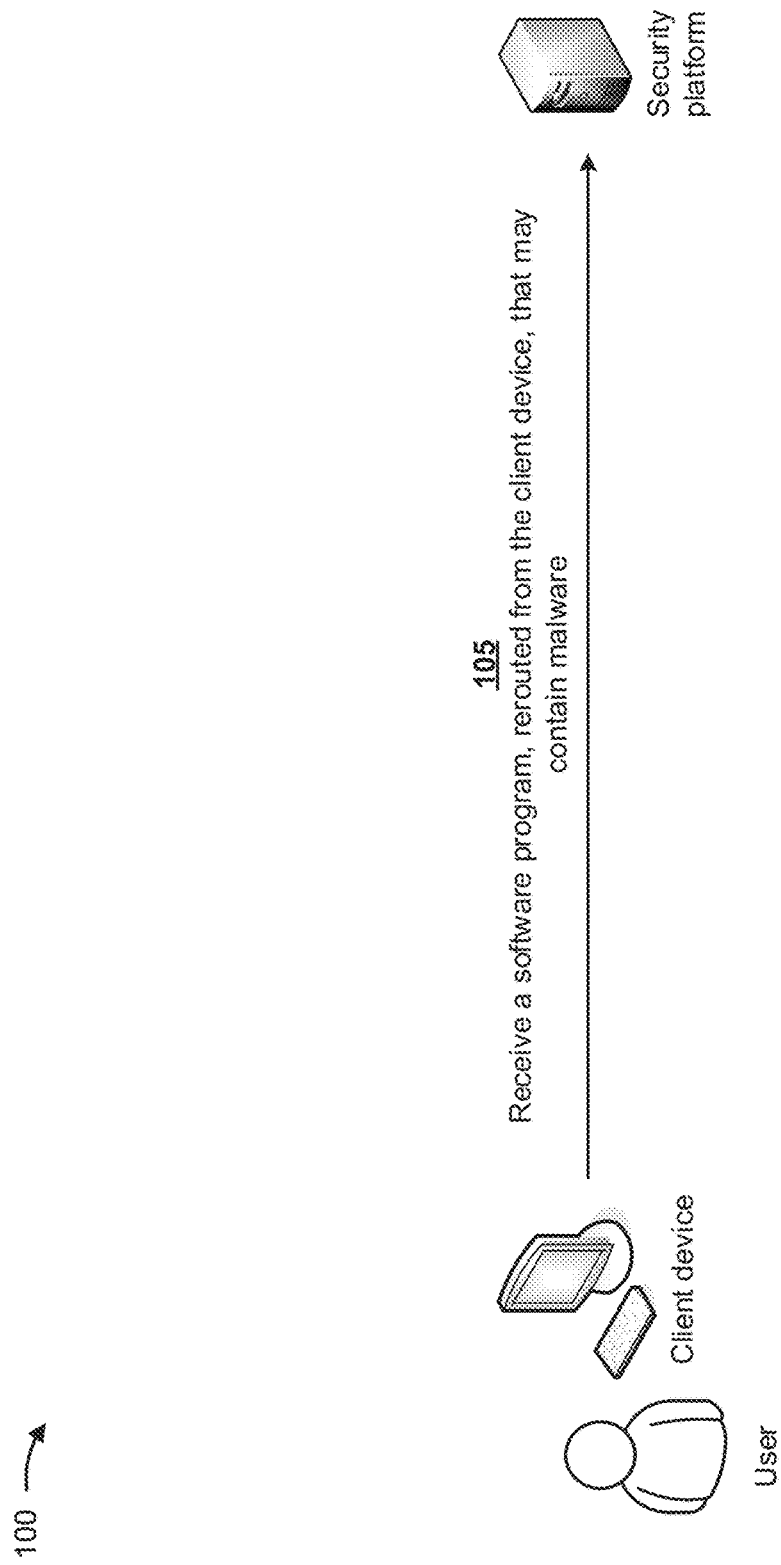
FIGS. 1A-1J are diagrams of an example implementation described herein.

The following detailed description of example implementations refers to the accompanying drawings. The same reference numbers in different drawings may identify the same or similar elements.

Introducing anti-armoring techniques in a sandbox may be helpful in enabling dynamic malware analysis of a software program. However, current malware utilizes methods that implement existing or new armoring techniques, which greatly undermines an effectiveness of the dynamic malware analysis within the sandbox. For example, assume that a software program utilizes the following sequence of API calls (e.g., an API trace) to exhibit malicious activity:
VirtualAlloc( )
VirtualProtect( )
IsDebuggerPresent( )
Sleep( )
CreateProcessInternalW( )
NtnmapViewOfSection( )
WriteProcessMemory( )
GetThreadContext( )
SetThreadContext( )
Exit( ).

If the software program is provided to a sandbox for dynamic malware analysis, the sandbox may be unable to neutralize any armoring present in the software program (e.g., which hides malware) because the sandbox does not include any anti-armoring solution or because the malware has introduced a new armoring technique unknown to the sandbox. For example, in the above software program, if anti-armoring is not implemented for the IsDebuggerPresent( ) API call and if the software program is utilizing the IsDebuggerPresent( ) API call as an armoring technique that disables program execution if the software program is being debugged, the sandbox may only identify the following API trace in the software program:
VirtualAlloc( )
VirtualProtect( )
IsDebuggerPresent( )
Exit( ).

Thus, the armoring technique reduces the quantity of API calls identified in the API trace, which results in poorer malware detection by the sandbox.

Some implementations described herein provide a security platform that extends dynamic detection of malware using static and dynamic malware analyses. For example, the security platform may receive a software program from a client device, and may provide the software program to a sandbox. The security platform may perform, via the sandbox, a dynamic malware analysis of the software program to generate dynamic malware analysis results, and may generate a call graph based on the dynamic malware analysis of the software program. The security platform may utilize, during the dynamic malware analysis of the software program, the call graph to identify at least one of an exit of the software program or a forced kill of the software program, and may perform, via the sandbox, a static malware analysis of the software program based on identifying the at least one of the exit of the software program or the forced kill of the software program. The security platform may generate static malware analysis results based on performing the static malware analysis of the software program, and may combine the dynamic malware analysis results and the static malware analysis results to generate combined malware analysis results. The security platform may perform one or more actions based on the combined malware analysis results.

In this way, the security platform may detect, via a sandbox, API traces for a software program that utilizes armoring techniques by combining a dynamic malware analysis with a static malware analysis of the software program. The security platform may determine APIs that would have been called and logged had the malware not used the armoring techniques, thus improving identification of API traces for the software program and providing improved malware detection. Solely using a static malware analysis for a software program with malware may be pointless unless the software program is unpacked and requires full emulation if the software program is packed, which is very difficult and complex to implement. Therefore, the security platform combines a static malware analysis of the software program with a dynamic malware analysis of the software program, which provides an advantage of the software program being unpacked during the dynamic malware analysis.

FIGS. 1A-1J are diagrams of an example implementation 100 described herein. As shown in FIG. 1A, a client device may be associated with a security platform and a user. In some implementations, the user may interact with the client device (e.g., via a user interface provided by the client device) to cause the client device to provide a software program (e.g., referred to as a software program) to the security platform. In some implementations, the software program may be rerouted from the client device to the security platform based on the client device identifying the software program as potentially including malware (e.g., malicious content) (e.g., without the user taking any action with regard to the software program), based on the software program being downloaded to the client, based on a network device (e.g., a firewall, a proxy device, an edge device, and/or the like) routing the software program to the security platform before sending to the client device, concurrently with sending to the client device, or after sending to the client device, and/or the like.

As further shown in FIG. 1A, and by reference number 105, the security platform may receive the software program, rerouted from the client device, that may contain malware. In some implementations, the software program may include malware, one or more application programming interface (API) calls that form one or more API traces (e.g., which may or may not indicate malicious activity), one or more function calls, and/or the like. In some implementations, the API calls may include APIs provided by systems and/or operating systems, such as a Windows Operating System, a Linux Operating System, an Apple iOS, and/or the like.

Figure 1B:
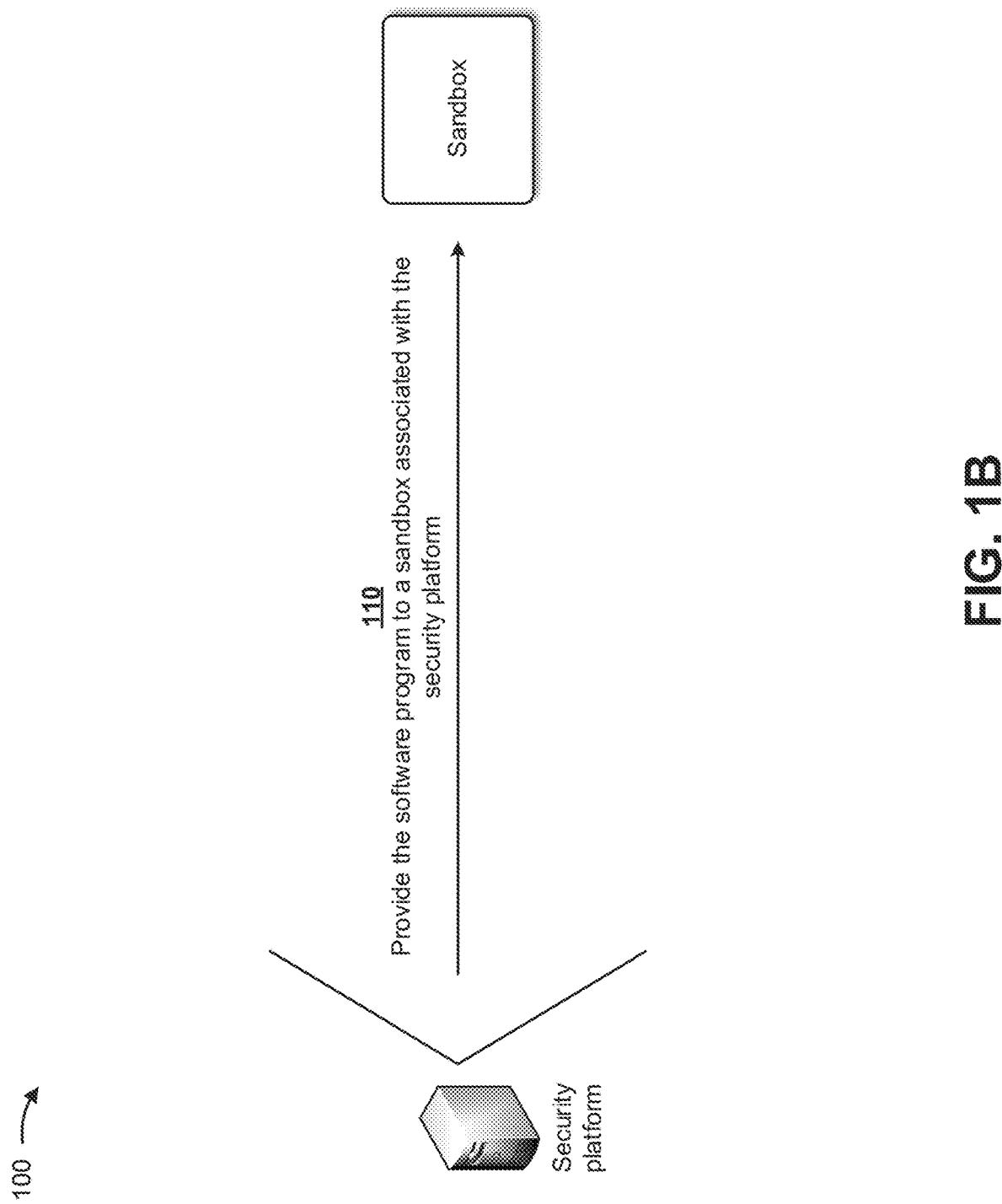

As shown in FIG. 1B, and by reference number 110, the security platform may provide the software program to a sandbox associated with the security platform. In some implementations, the security platform may include or be associated with a sandbox or a sandbox agent that performs a dynamic malware analysis of a software program to obtain API call traces. In some implementations, the security platform (e.g., via the sandbox) may perform a static malware analysis of a software program to obtain API call traces. In some implementations, the sandbox may include a static malware analysis module implemented as a program that is external to a software program being analyzed or as a part of an analysis agent dynamic link library (DLL) that is executing within the software program being analyzed.

Figure 1C:
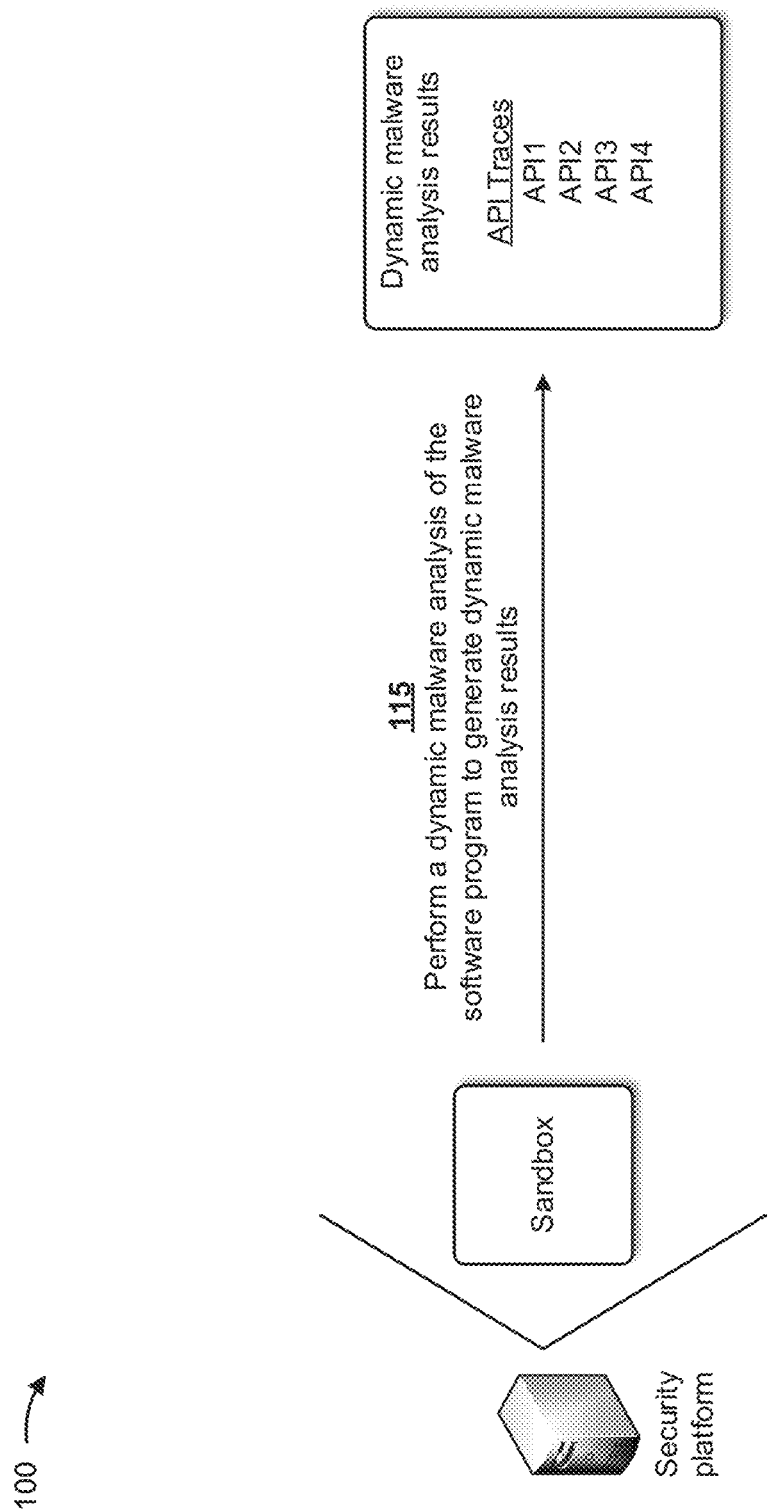

As shown in FIG. 1C, and by reference number 115 the security platform (e.g., via the sandbox) may perform a dynamic malware analysis of the software program to generate dynamic malware analysis results. For example, the dynamic malware analysis results may include one or more API traces, such as an API trace (e.g., API1, API2, API3, and API4) shown in FIG. 1C. In some implementations, the security platform (e.g., via the sandbox) may perform the dynamic malware analysis (e.g., the API call tracing) of the software program via an API hooking mechanism (e.g., a mechanism that modifies behavior and flow of API calls), one or more dynamic instrumentation mechanisms (e.g., PIN—a platform for creating analysis tools, Dynamo-RIO—a dynamic binary instrumentation framework, etc.), and/or the like.

Figure 1D:
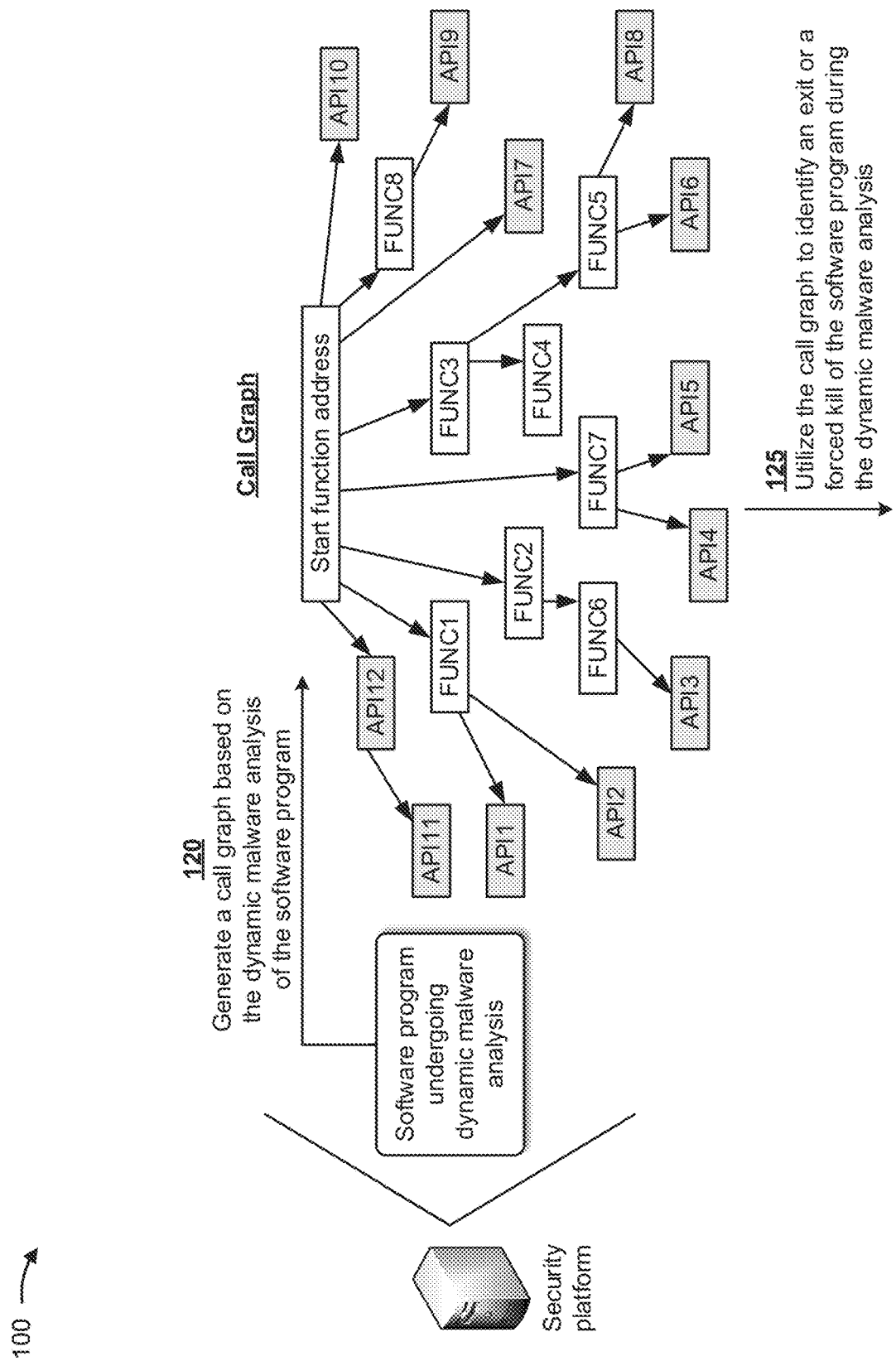

As shown in FIG. 1D, and by reference number 120, the security platform may generate a call graph based on the dynamic malware analysis of the software program. In some implementations, as the software program executes, the security platform (e.g., via the sandbox) may track and save addresses of function calls in the software program, and may build the call graph based on the function calls (e.g., FUNC1, FUNC2, . . . , FUNC8, as shown in FIG. 1D). In some implementations, the security platform may label a function call as an API (e.g., a Win32 API) if the function call includes an API address (e.g., AP1, AP2, . . . , API12, as shown in FIG. 1D).

While the security platform may utilize functions calls to build the call graph, in some implementations, the security platform may build a similar call graph using addresses of CALL assembly instructions (e.g., in the software program) that result in a function call. Either of the call graphs built by the security platform may be subsequently utilized in a similar manner by the security platform. Building the call graph and adding a node entry for a function call using CALLEE addresses may be useful for handling cases where, inside a function, a malware unpacks and executes a jump (JMP) command in the unpacked code, which otherwise may not be tracked as a function call that needs to be inserted into the call graph.

Alternatively, the security platform may track memory allocations made by the software program, such as a VirtualAlloc( ) memory call or memory writes into regions that are turned into executable pages or which are executable pages, may track a jump command to these regions, may treat the jump command as equivalent to a function call, may insert the jump command in the call graph, and/or the like.

In some implementations, if the security platform is using API hooking to determine function call tracing, and since a quantity of hooked API functions may be limited to a fixed set of APIs, for every API identified, the security platform may build a call graph backwards from the API by walking up a memory stack and by using a return address from a function call, until a starting point of the software program is reached. In some implementations, if the security platform is using an instrumentation utility, such as PIN or Dynamo-RIO, the security platform may create a call instruction that permits building of the call graph.

As further shown in FIG. 1D, shaded nodes of the call graph may correspond to APIs (e.g., Win32 APIs), and unshaded nodes of the call graph may correspond to intermediate function calls that are called on-route to the APIs. As further shown in FIG. 1D, and by reference number 125, the security platform may utilize, during the dynamic malware analysis, the call graph to identify an exit of the software program, a forced kill of the software program, and/or the like. In some implementations, the security platform may utilize the dynamic malware analysis of the software program until the security platform determines that the software program is exiting, that the software program is being forced to exit (e.g., a forced kill), and/or the like.

Figure 1E:
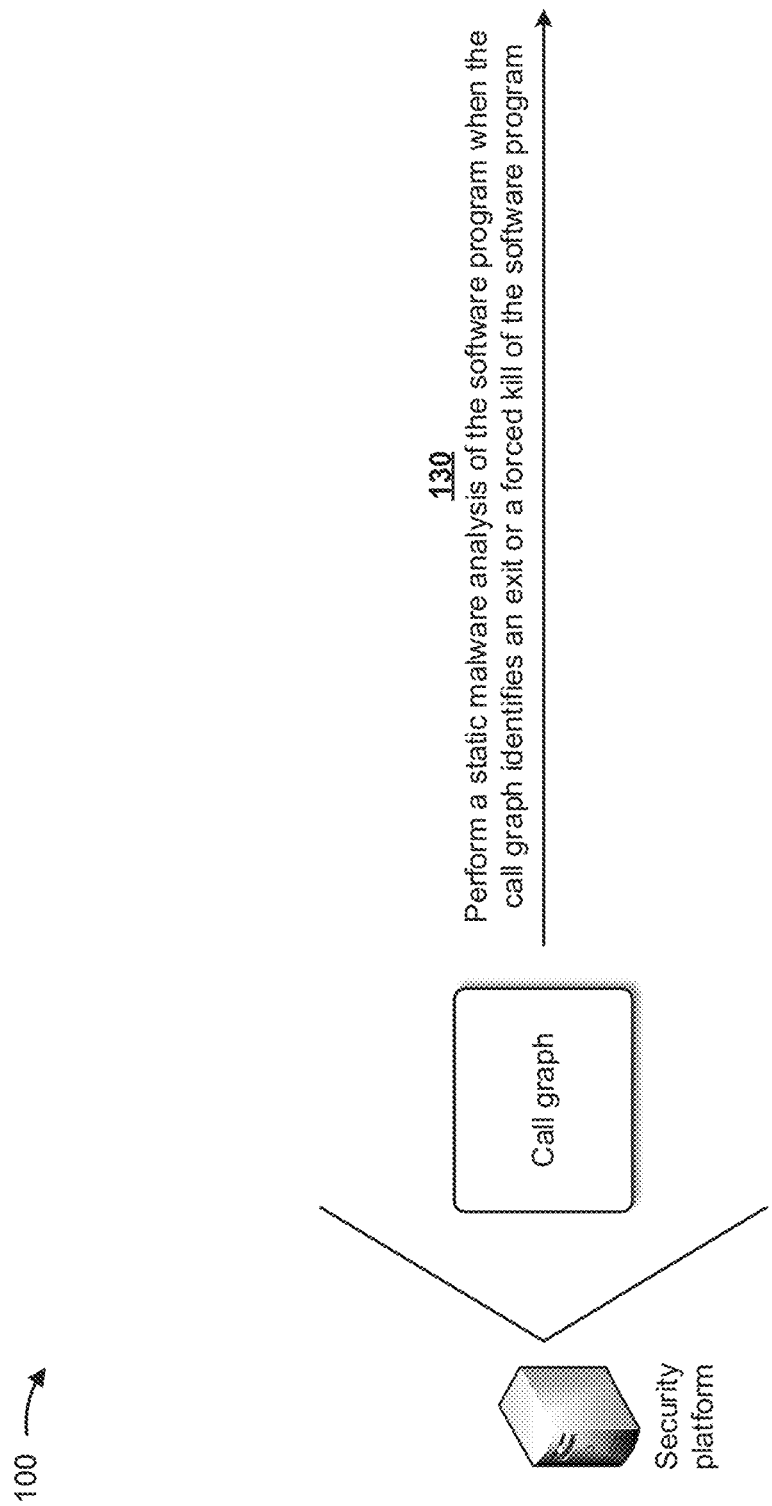

In some implementations, when the security platform determines that the software program is exiting, the software program is being forced to exit, and/or the like, the security platform may pause the software program and may instruct the static malware analysis module to perform a static malware analysis of the software program. For example, as shown in FIG. 1E, and by reference number 130, the security platform may perform the static malware analysis of the software program when the call graph identifies an exit, of the software program, a forced kill of the software program, and/or the like. In such implementations, the security platform may provide the call graph and addresses to the static malware analysis module so that the static malware analysis module may conduct the static malware analysis. For each node in the call graph, the static malware analysis module may disassemble instructions from an address of the node onwards, and may track control flow until arriving at an API node. The static malware analysis module may backtrack and continue the same process until all control flow paths are covered, starting from the beginning address. Using this process, the static malware analysis module may create multiple API call traces similar to dynamic API tracing.

Figure 1F:
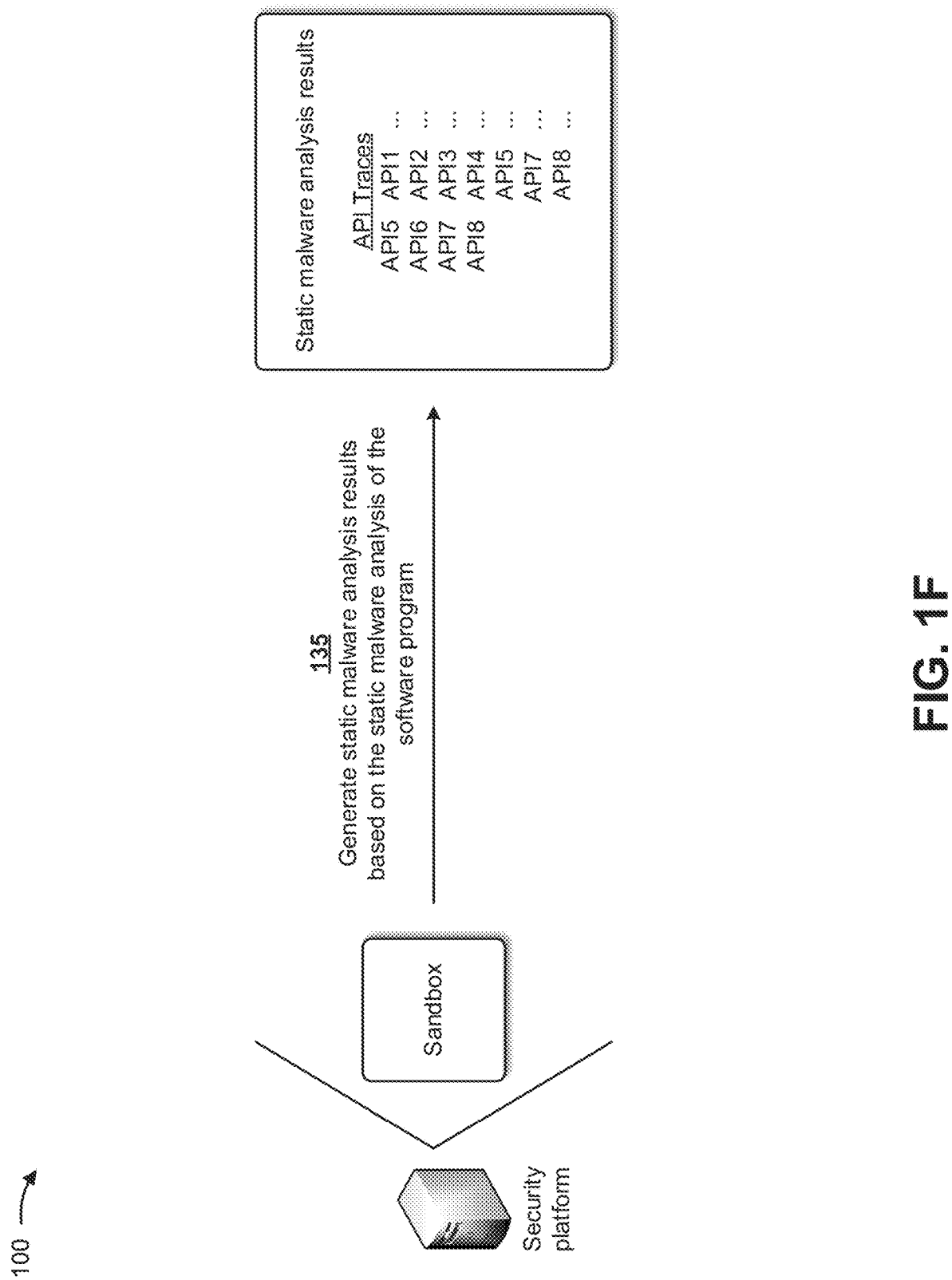

As shown in FIG. 1F, and by reference number 135, the security platform (e.g., via the sandbox) may generate static malware analysis results based on the static malware analysis of the software program. In some implementations, the static malware analysis results may include one or more API traces, such as a first API trace (e.g., API5, API6, API7, and API8), a second API trace (e.g., API1, API2, API3, AP14, API5, API7, and API8), and/or the like.

Figure 1G:
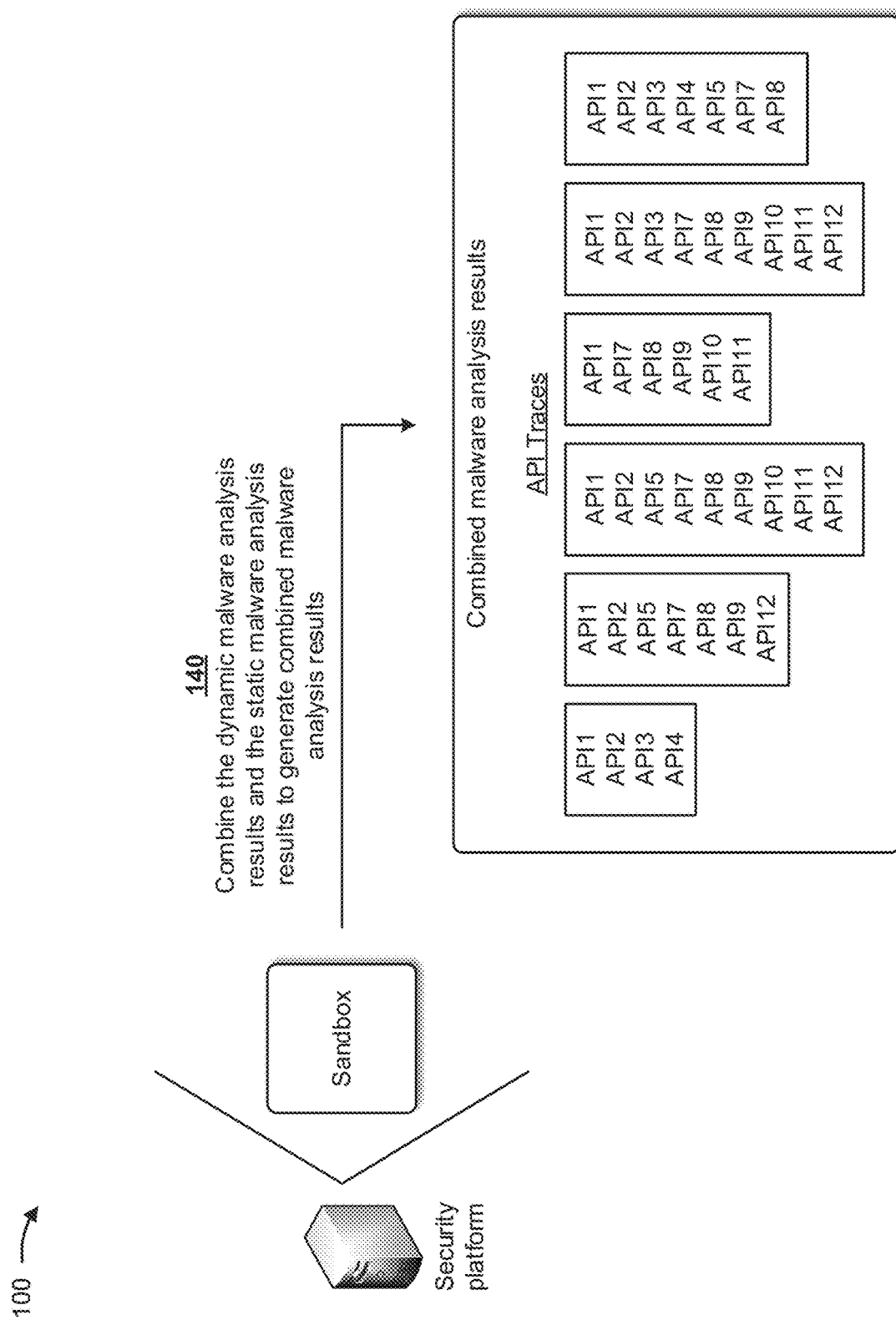

As further shown in FIG. 1G, and by reference number 140, the security platform (e.g., via the sandbox) may combine the dynamic malware analysis results and the static malware analysis results to generate combined malware analysis results. In some implementations, the combined malware analysis results may include the API traces identified by the dynamic malware analysis and the API traces identified by the static malware analysis. For example, as further shown in FIG. 1G, the combined malware analysis results may include multiple API traces, such as a first API trace (e.g., API1, API2, API3, and API4), a second API trace (e.g., API1, API2, API5, API7, API8, API9, and API12), a third API trace (e.g., API1, API2, API5, API7, API8, API9, API10, API11, and API12), a fourth API trace (e.g., API1, API7, API8, API9, API10, and API11), a fifth API trace (e.g., API1, API2, API3, API7, API5, API9, API10, API11, and API12), a sixth API trace (e.g., API1, API2, API3, API4, API5, API7, and API8), and/or the like. In some implementations, the first API trace may be similar to dynamic malware analysis results, and the sixth API trace may be identified (e.g., by the security platform) as a malicious sequence of APIs, which should have been logged by dynamic malware analysis, but was not because of armoring by the malware.

In some implementations, the security platform may identify malicious API traces in the combined malware analysis results based on a list of known malicious API traces. In some implementations, the security platform may identify malicious API traces in the combined malware analysis results based on a machine learning model (e.g., a classifier machine learning model).

In some implementations, the security platform may perform a training operation on the machine learning model with historical malicious API traces (e.g., historical information that identifies API traces found to be malicious). For example, the security platform may separate the historical malicious API traces into a training set, a validation set, a test set, and/or the like. In some implementations, the security platform may train the machine learning model using, for example, an unsupervised training procedure and based on the training set of the historical malicious API traces. For example, the security platform may perform dimensionality reduction to reduce the historical malicious API traces to a minimum feature set, thereby reducing resources (e.g., processing resources, memory resources, and/or the like) to train the machine learning model, and may apply a classification technique, to the minimum feature set.

In some implementations, the security platform may use a logistic regression classification technique to determine a categorical outcome (e.g., that the historical API traces are malicious). Additionally, or alternatively, the security platform may use a naïve Bayesian classifier technique. In this case, the security platform may perform binary recursive partitioning to split the historical malicious API traces into partitions and/or branches, and use the partitions and/or branches to perform predictions (e.g., that the historical malicious API traces are malicious). Based on using recursive partitioning, the security platform may reduce utilization of computing resources relative to manual, linear sorting and analysis of data points, thereby enabling use of thousands, millions, or billions of data points to train the machine learning model, which may result in a more accurate model than using fewer data points.

Additionally, or alternatively, the security platform may use a support vector machine (SVM) classifier technique to generate a non-linear boundary between data points in the training set. In this case, the non-linear boundary is used to classify test data into a particular class.

Additionally, or alternatively, the security platform may train the machine learning model using a supervised training procedure that includes receiving input to the machine learning model from a subject matter expert, which may reduce an amount of time, an amount of processing resources, and/or the like to train the machine learning model of activity automatability relative to an unsupervised training procedure. In some implementations, the security platform may use one or more other model training techniques, such as a neural network technique, a latent semantic indexing technique, and/or the like. For example, the security platform may perform an artificial neural network processing technique (e.g., using a two-layer feedforward neural network architecture, a three-layer feedforward neural network architecture, and/or the like) to perform pattern recognition with regard to optimal regions of the historical malicious API traces. In this case, using the artificial neural network processing technique may improve an accuracy of the trained machine learning model generated by the security platform by being more robust to noisy, imprecise, or incomplete data, and by enabling the security platform to detect patterns and/or trends undetectable to human analysts or systems using less complex techniques.

In some implementations, the security platform may analyze the dynamic malware analysis results and/or the static malware analysis results (e.g., API traces), with one or more machine learning models, to determine if there are malicious API traces. For example, the security platform may analyze the API traces from just the dynamic malware analysis. If the security platform determines that the analysis of such API traces is insufficient (e.g., results in a threshold quantity of API traces not being determined), leads to no malware detection, detects a possible early exit (e.g., because of an early exit or because of armoring), and/or the like, the security platform may analyze the other API call traces obtained from the static malware analysis. In this way, the security platform may be provided access to more API call traces, and may better detect malware in the software program. In some implementations, the security platform may determine that the API traces from the dynamic malware analysis are sufficient (e.g., results in the threshold quantity of API traces being determined), and may not perform the static malware analysis. In this way, the security platform may conserve resources (e.g., processing resources, memory resources, and/or the like) that would otherwise be utilized to perform the static malware analysis.

Figure 1H:
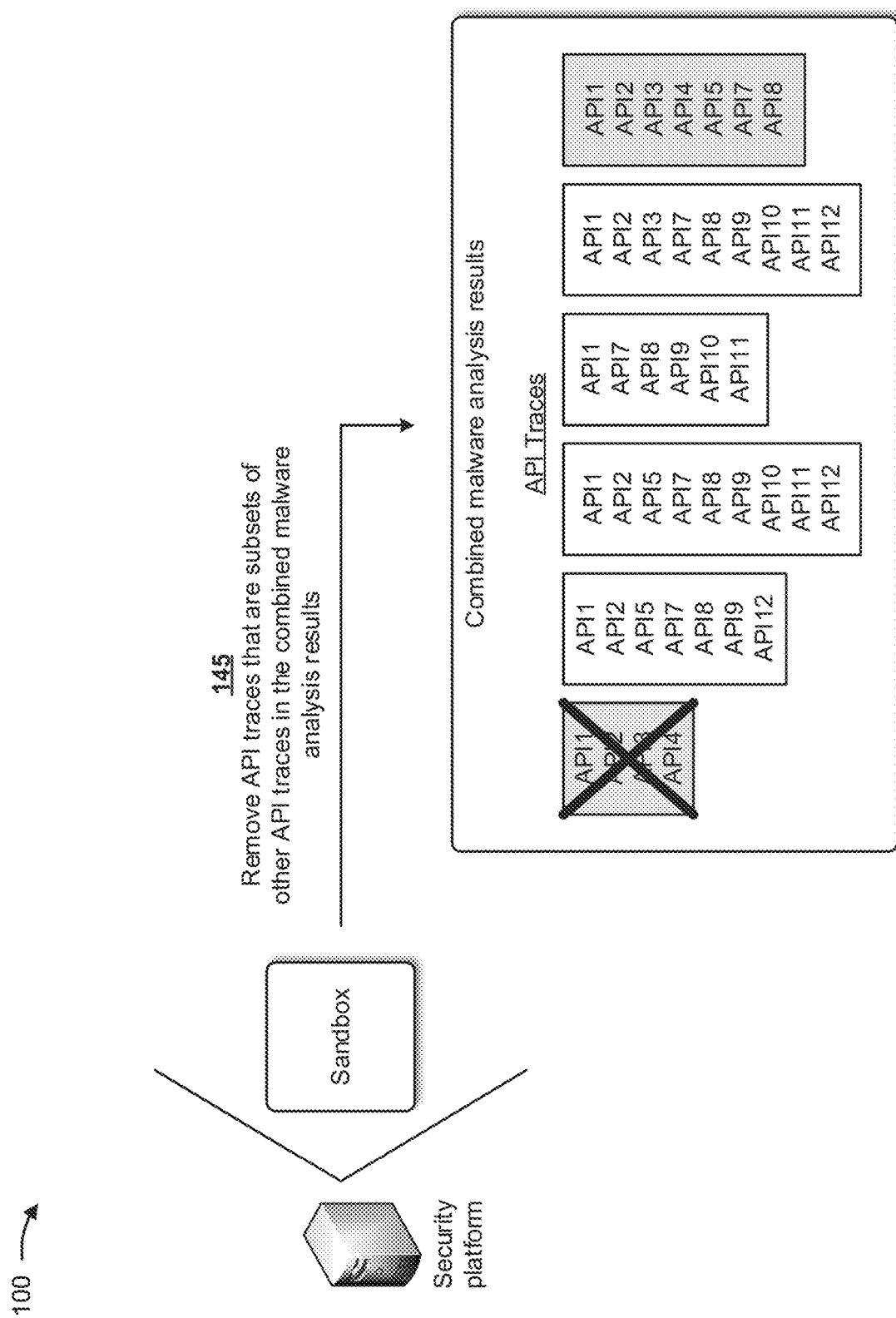

As shown in FIG. 1H, and by reference number 145, the security platform may remove, from the multiple API traces identified in the combined malware analysis results (e.g., shown in FIG. 1G), API traces that are subsets of other API traces. In some implementations, the security platform may remove the API traces that are subsets of other API traces (e.g., from the dynamic malware analysis results and/or the static malware analysis results) before analyzing the dynamic malware analysis results and/or the static malware analysis results (e.g., API traces). In this way, the security platform may identify redundant API traces and conserve resources (e.g., processing resources, memory resources, and/or the like) that would otherwise be used to analyze these redundant API traces. For example, as shown in FIG. 1H, the first API trace (e.g., API1, API2, API3, and API4) is a subset of the sixth API trace (e.g., API1, API2, API3, API4, API5, API7, and API8). Thus, the security platform may remove the first API trace from the combined malware analysis results.

Figure 1I:
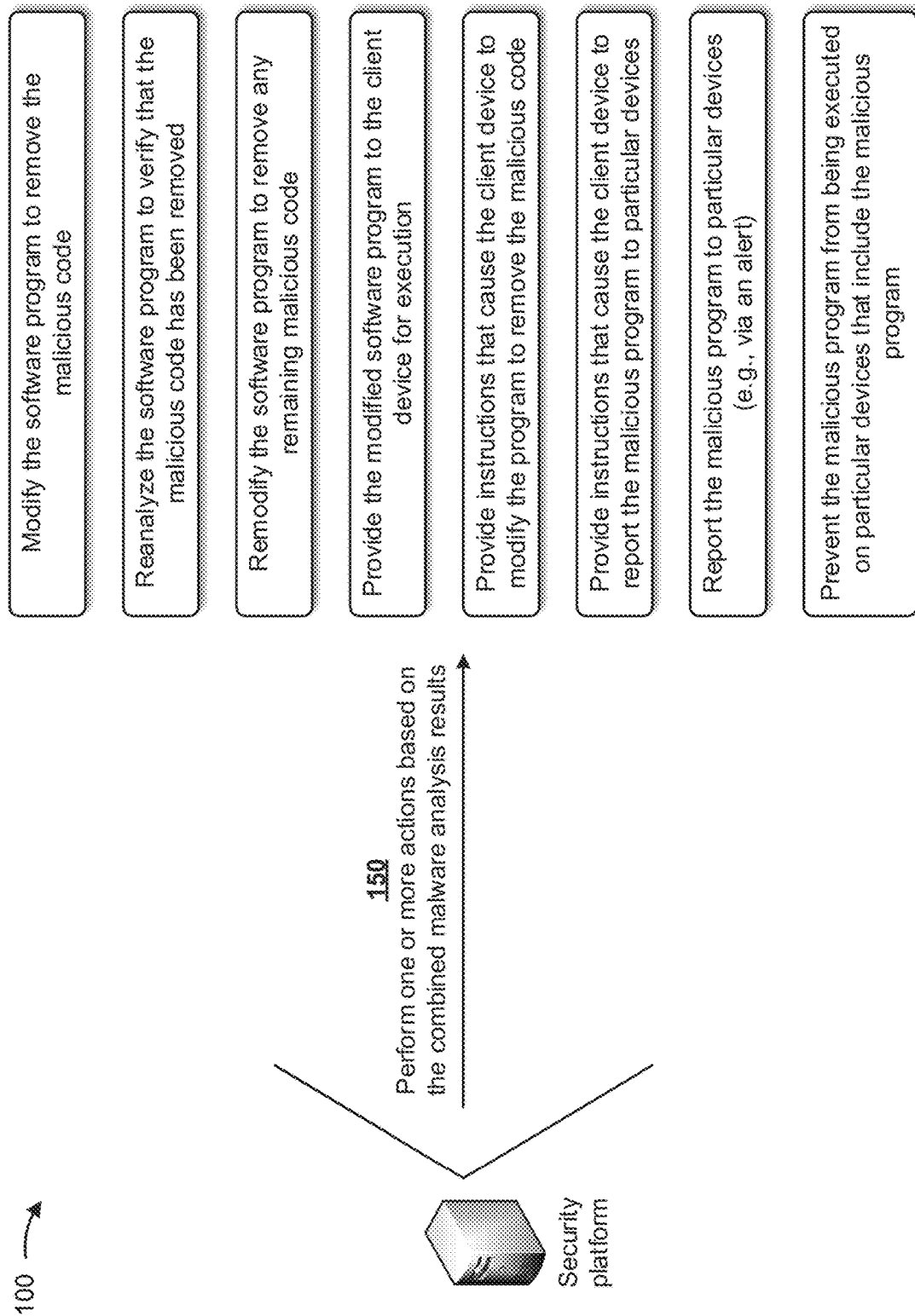

As shown in FIG. 1I, and by reference number 150, the security platform may perform one or more actions based on the combined malware analysis results. In some implementations, the security platform may perform the one or more actions based on identification of one or more malicious API traces in the combined malware analysis results.

In some implementations, the one or more actions may include the security platform modifying the software program to remove malicious code from the software program. For example, the security platform may remove one or more malicious API traces from the software program. In this way, the security platform may prevent the malicious code from spreading to other devices and/or other software programs.

In some implementations, the one or more actions may include the security platform reanalyzing the software program to verify that all of the malicious code has been removed. For example, the security platform may perform the dynamic malware analysis and the static malware analysis to verify that all of the malicious code has been removed from the software program. In this way, the security platform may ensure that no malicious code is present in the software program.

In some implementations, the one or more actions may include the security platform remodifying the software program to remove any remaining malicious code. For example, if the security platform determines that additional malicious code remains in the software program, the security platform may remove the additional malicious code from the software program. In this way, the security platform may ensure that no malicious code is present in the software program.

In some implementations, the one or more actions may include the security platform providing the modified program to the client device for execution. For example, after verifying that all of the malicious code has been removed from the software program, the security platform may provide the software program to the client device, and the client device may execute the software program. In this way, the client device may execute a software program that is free of malicious code.

In some implementations, the one or more actions may include the security platform sending, to the client device, instructions that cause the client device to modify the software program to remove the malicious code. For example, the client device may hold the software code in quarantine, and the security platform may cause the client device to remove one or more malicious API traces from the software program in quarantine. In this way, the security platform may prevent the malicious code from infecting the client device.

In some implementations, if the client device begins executing the software program, the security platform may cause the cause the client device to uninstall and delete the software program and execute a malware check after uninstalling the software program. In some implementations, the security platform may have an agent executing on the client device that is recording everything performed by the software program while it is executing on the client device and the security platform may cause the agent to undo actions performed by the software program.

In some implementations, the one or more actions may include the security platform sending, to the client device, instructions that cause the client device to report the malicious program to particular devices. For example, the security platform may cause the client device to report, to the particular devices, one or more malicious API traces from the software program. In this way, the security platform may prevent the malicious code from spreading to the particular devices. In some implementations, the security platform may cause the particular devices to execute a malware check and/or may cause the particular devices to perform one or more of the functions described above with respect to the client device.

In some implementations, the one or more actions may include the security platform reporting the malicious program to particular devices (e.g., via an alert). For example, the security platform may report, to the particular devices, one or more malicious API traces from the software program. In this way, the security platform may prevent the malicious code from spreading to the particular devices.

In some implementations, the one or more actions may include the security platform preventing the malicious software program from being executed on particular devices that include the malicious software program. For example, the security platform may provide, to the particular devices, instructions to not execute the malicious software program, and the particular devices may not execute the malicious software program based on the instructions. In this way, the security platform may prevent the malicious code from spreading to the particular devices.

In some implementations, the one or more actions may include the security platform removing the malicious software program from particular devices that include the malicious program. For example, the security platform may provide, to the particular devices, instructions to remove the malicious software program, and the particular devices may remove the malicious software program based on the instructions. In this way, the security platform may prevent the malicious code from spreading to the particular devices.

Figure 1J:
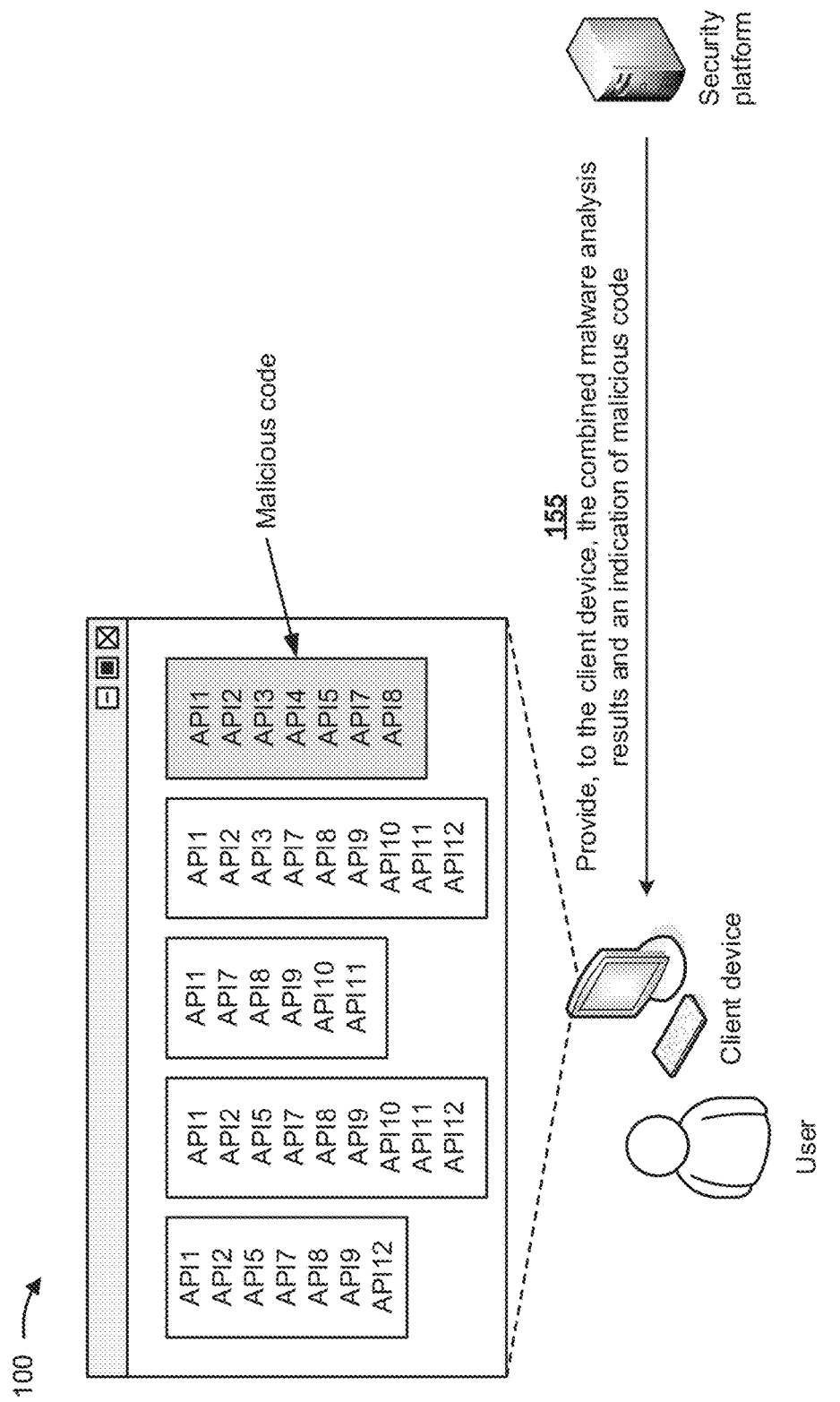

As shown in FIG. 1J, and by reference number 155, the security platform may provide, to the client device, information identifying the combined malware analysis results and an indication of malicious code (e.g., a malicious API trace). The client device may receive the information identifying the combined malware analysis results and an indication of malicious code, and may present the information to the user. For example, the client device may present the combined malware analysis results (e.g., with the first API trace removed), and an indication that the sixth API trace (e.g., API1, API2, API3, API4, AP15, API7, and API8) is malicious code. In some implementations, the security platform may provide to the client device, and the client device may present, a notification indicating that software program contains malware, that the malware has been removed, and that the software program is safe to execute.

In this way, several different stages of the process for extending dynamic detection of malware using static and dynamic malware analyses may be automated, which may remove human subjectivity and waste from the process, and which may improve speed and efficiency of the process and conserve computing resources (e.g., processor resources, memory resources, and/or the like). Furthermore, implementations described herein use a rigorous, computerized process to perform tasks or roles that were not previously performed or were previously performed using subjective human intuition or input. For example, currently there does not exist a technique to extend dynamic detection of malware using static and dynamic malware analyses. Finally, automating the process for extending dynamic detection of malware using static and dynamic malware analyses conserves computing resources (e.g., processor resources, memory resources, and/or the like) that would otherwise be wasted in attempting to detect malware in software programs.

As indicated above, FIGS. 1A-1J are provided merely as examples. Other examples are possible and may differ from what was described with regard to FIGS. 1A-1J.

Figure 2:
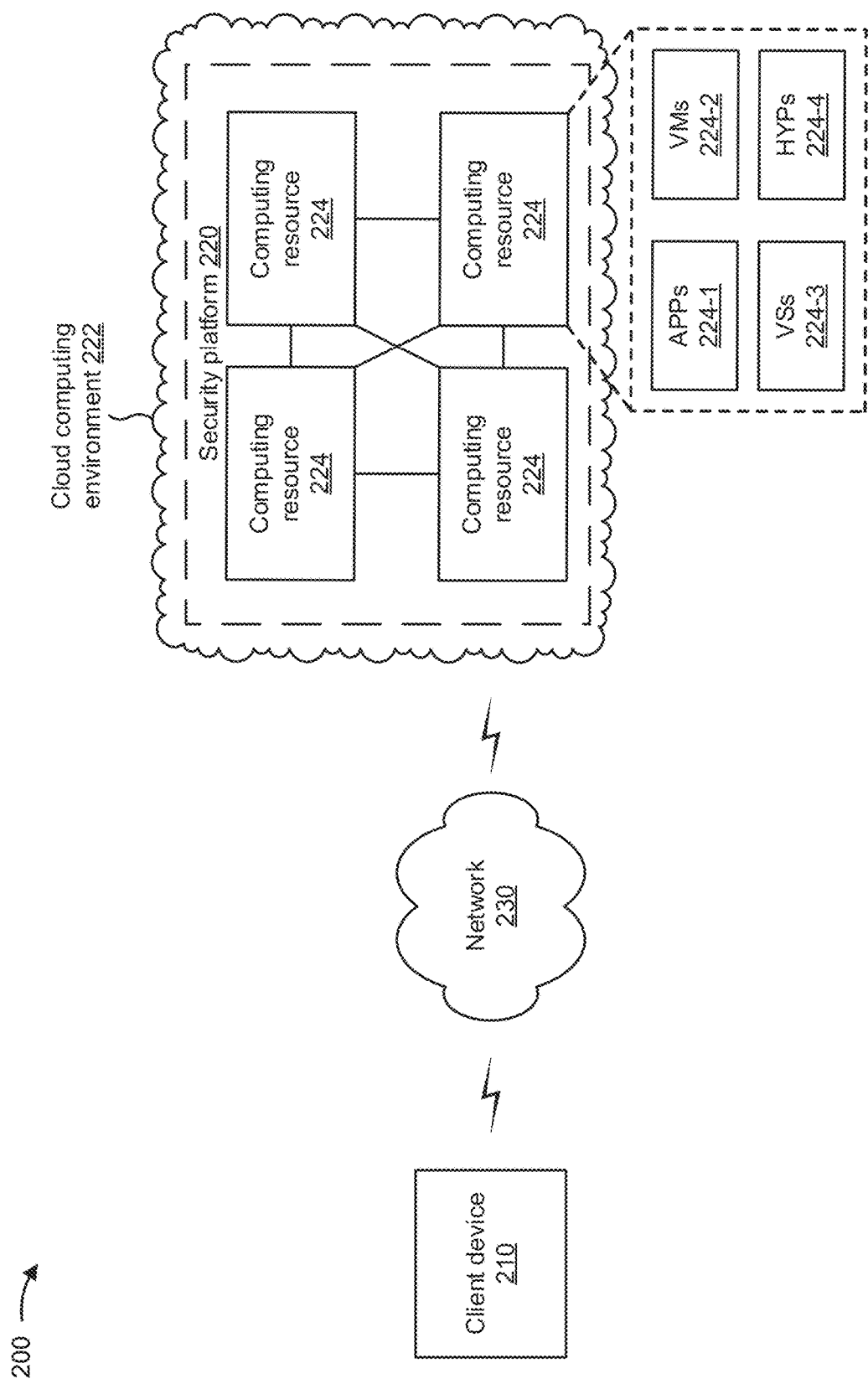
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a security platform 220, and a network 230. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may receive information from and/or transmit information to security platform 220. In some implementations, client device 210 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a Global Positioning Satellite (GPS) device, a server device, a personal computer, or a similar type of device.

Security platform 220 includes one or more devices that extend dynamic detection of malware using static and dynamic malware analyses. In some implementations, security platform 220 may be designed to be modular such that certain software components may be swapped in or out depending on a particular need. As such, security platform 220 may be easily and/or quickly reconfigured for different uses. In some implementations, security platform 220 may receive information from and/or transmit information to client device 210.

In some implementations, as shown, security platform 220 may be hosted in a cloud computing environment 222. Notably, while implementations described herein describe security platform 220 as being hosted in cloud computing environment 222, in some implementations, security platform 220 may not be cloud-based (i.e., may be implemented outside of a cloud computing environment) or may be partially cloud-based.

Cloud computing environment 222 includes an environment that hosts security platform 220. Cloud computing environment 222 may provide computation, software, data access, storage, etc. services that do not require end-user knowledge of a physical location and configuration of system(s) and/or device(s) that hosts security platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host security platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210. Application 224-1 may eliminate a need to install and execute the software applications on client device 210. For example, application 224-1 may include software associated with security platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of client device 210 or an operator of security platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
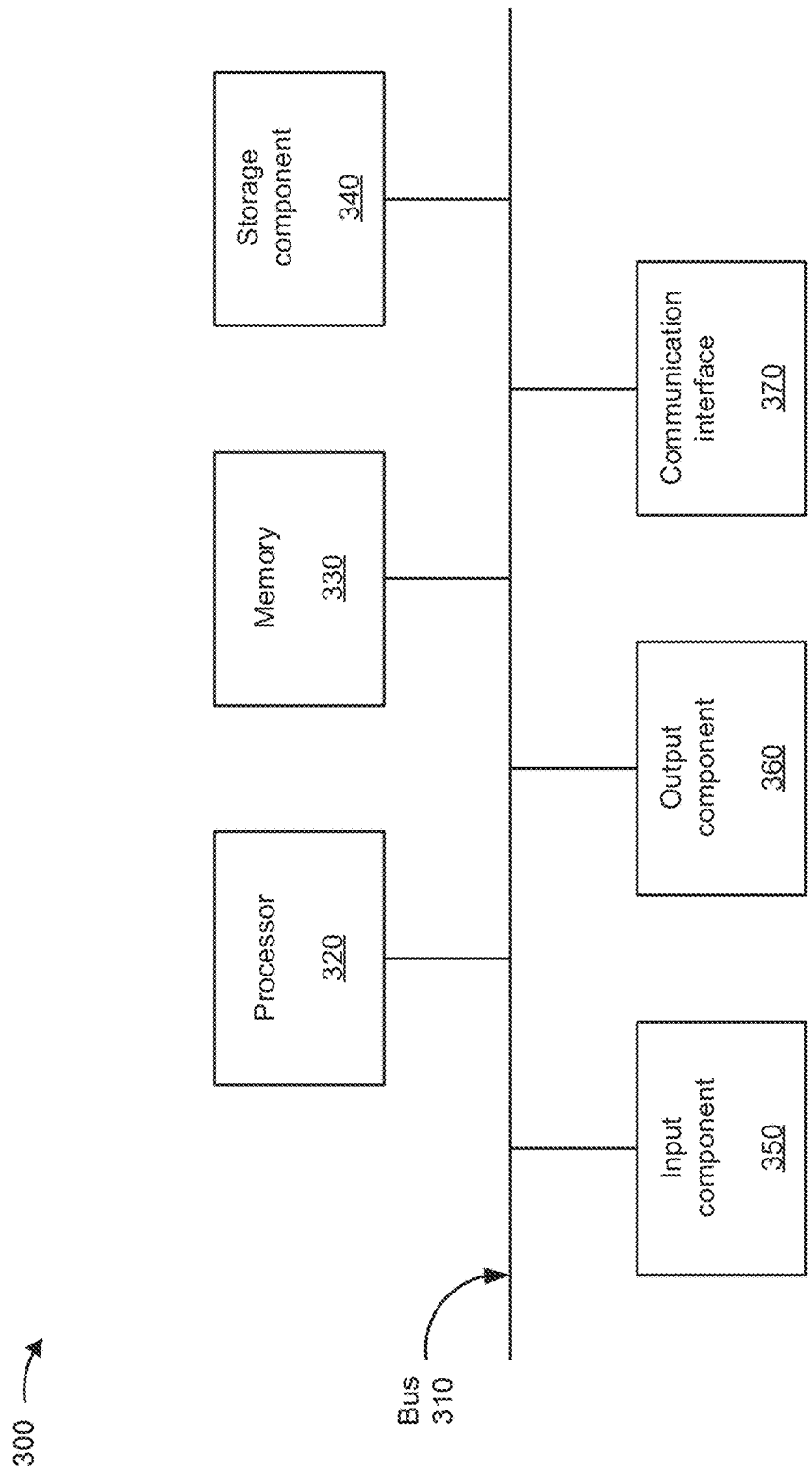
FIG. 3 is a diagram of example components of one or more devices of FIG. 2.

FIG. 3 is a diagram of example components of a device 300. Device 300 may correspond to client device 210, security platform 220, and/or computing resource 224. In some implementations, client device 210, security platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
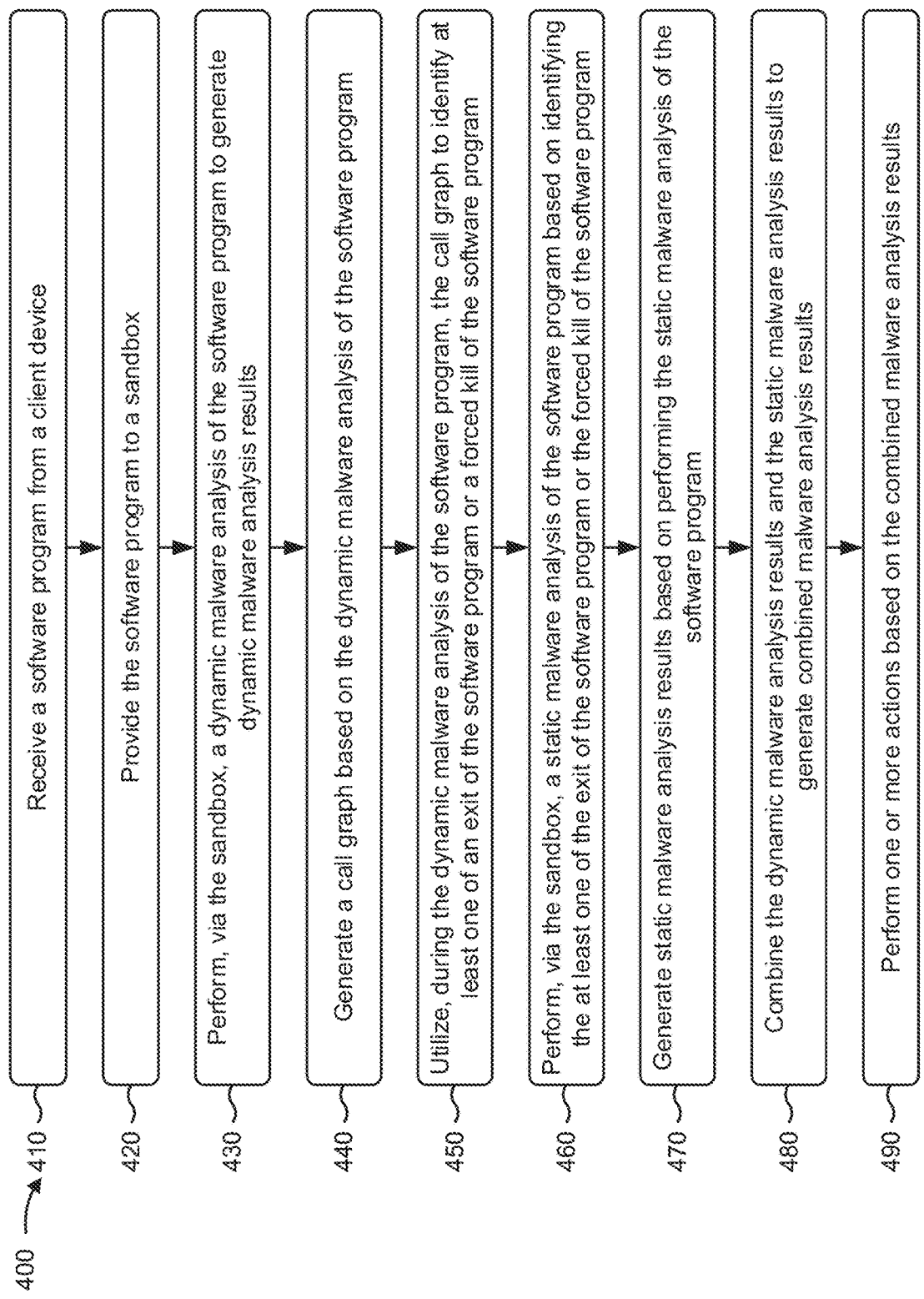

FIG. 4 is a flow chart of an example process 400 for extending dynamic detection of malware using static and dynamic malware analyses. In some implementations, one or more process blocks of FIG. 4 may be performed by a security platform (e.g., security platform 220). In some implementations, one or more process blocks of FIG. 4 may be performed by another device or a group of devices separate from or including the security platform, such as a client device (e.g., client device 210).

As shown in FIG. 4, process 400 may include receiving a software program from a client device (block 410). For example, the security platform (e.g., using computing resource 224, processor 320, communication interface 370, and/or the like) may receive a software program from a client device, as described above in connection with FIGS. 1A-2.

As further shown in FIG. 4, process 400 may include providing the software program to a sandbox (block 420). For example, the security platform (e.g., using computing resource 224, processor 320, storage component 340, and/or the like) may provide the software program to a sandbox, as described above in connection with FIGS. 1A-2.

As further shown in FIG. 4, process 400 may include performing, via the sandbox, a dynamic malware analysis of the software program to generate dynamic malware analysis results (block 430). For example, the security platform (e.g., using computing resource 224, processor 320, memory 330, and/or the like) may perform, via the sandbox, a dynamic malware analysis of the software program to generate dynamic malware analysis results, as described above in connection with FIGS. 1A-2.

As further shown in FIG. 4, process 400 may include generating a call graph based on the dynamic malware analysis of the software program (block 440). For example, the security platform (e.g., using computing resource 224, processor 320, storage component 340, and/or the like) may generate a call graph based on the dynamic malware analysis of the software program, as described above in connection with FIGS. 1A-2.

As further shown in FIG. 4, process 400 may include utilizing, during the dynamic malware analysis of the software program, the call graph to identify at least one of an exit of the software program, or a forced kill of the software program (block 450). For example, the security platform (e.g., using computing resource 224, processor 320, memory 330, and/or the like) may utilize, during the dynamic malware analysis of the software program, the call graph to identify at least one of an exit of the software program, or a forced kill of the software program, as described above in connection with FIGS. 1A-2.

As further shown in FIG. 4, process 400 may include performing, via the sandbox, a static malware analysis of the software program based on identifying the at least one of the exit of the software program or the forced kill of the software program (block 460). For example, the security platform (e.g., using computing resource 224, processor 320, memory 330, storage component 340, and/or the like) may perform, via the sandbox, a static malware analysis of the software program based on identifying the at least one of the exit of the software program or the forced kill of the software program, as described above in connection with FIGS. 1A-2.

As further shown in FIG. 4, process 400 may include generating static malware analysis results based on performing the static malware analysis of the software program (block 470). For example, the security platform (e.g., using computing resource 224, processor 320, memory 330, and/or the like) may generate static malware analysis results based on performing the static malware analysis of the software program, as described above in connection with FIGS. 1A-2.

As further shown in FIG. 4, process 400 may include combining the dynamic malware analysis results and the static malware analysis results to generate combined malware analysis results (block 480). For example, the security platform (e.g., using computing resource 224, processor 320, storage component 340, and/or the like) may combine the dynamic malware analysis results and the static malware analysis results to generate combined malware analysis results, as described above in connection with FIGS. 1A-2.

As further shown in FIG. 4, process 400 may include performing one or more actions based on the combined malware analysis results (block 490). For example, the security platform (e.g., using computing resource 224, processor 320, memory 330, communication interface 370, and/or the like) may perform one or more actions based on the combined malware analysis results, as described above in connection with FIGS. 1A-2.

Process 400 may include additional implementations, such as any single implementation or any combination of implementations described below and/or in connection with one or more other processes described elsewhere herein.

In some implementations, the security platform may remove application programming interface (API) traces, provided in the combined malware analysis results, that are subsets of other API traces provided in the combined malware analysis results. In some implementations, when performing the one or more actions, the security platform may modify the software program to remove malicious code and to generate a modified software program, may provide the modified software program to the client device for execution, may reanalyze the software program to verify that the malicious code has been removed from the software program, and/or may remodify the software program to remove any remaining malicious code based on reanalyzing the software program.

In some implementations, when performing the one or more actions, the security platform may provide, to the client device, instructions that cause the client device to modify the software program to remove malicious code, may provide, to the client device, instructions that cause the client device to report the software program and the malicious code to particular devices, may report the software program and the malicious code to the particular devices, may prevent the software program and the malicious code from being executed on the particular devices that include the software program and the malicious code, and/or may remove the software program and malicious code from the particular devices that include the software program and the malicious code.

In some implementations, when performing the dynamic malware analysis of the software program, the security platform may perform an application programming interface (API) tracing of the software program via an API hooking mechanism, or perform the API tracing of the software program via one or more dynamic instrumentation mechanisms. In some implementations, when performing the static malware analysis of the software program, the security platform may utilize the call graph to perform the static malware analysis of the software program. In some implementations, the dynamic malware analysis results may include information identifying one or more application programming interface (API) traces provided in the software program, and the static malware analysis results may include information identifying one or more additional API traces provided in the software program.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for extending dynamic detection of malware using static and dynamic malware analyses. In some implementations, one or more process blocks of FIG. 5 may be performed by a security platform (e.g., security platform 220). In some implementations, one or more process blocks of FIG. 5 may be performed by another device or a group of devices separate from or including the security platform, such as a client device (e.g., client device 210).

As shown in FIG. 5, process 500 may include receiving a software program from a client device (block 510). For example, the security platform (e.g., using computing resource 224, processor 320, communication interface 370, and/or the like) may receive a software program from a client device, as described above in connection with FIGS. 1A-2.

As further shown in FIG. 5, process 500 may include performing a dynamic malware analysis of the software program to generate dynamic malware analysis results (block 520). For example, the security platform (e.g., using computing resource 224, processor 320, memory 330, and/or the like) may perform a dynamic malware analysis of the software program to generate dynamic malware analysis results, as described above in connection with FIGS. 1A-2.

As further shown in FIG. 5, process 500 may include generating a call graph based on the dynamic malware analysis of the software program (block 530). For example, the security platform (e.g., using computing resource 224, processor 320, storage component 340, and/or the like) may generate a call graph based on the dynamic malware analysis of the software program, as described above in connection with FIGS. 1A-2.

As further shown in FIG. 5, process 500 may include utilizing, during the dynamic malware analysis of the software program, the call graph to identify at least one of an exit of the software program, or a forced kill of the software program (block 540). For example, the security platform (e.g., using computing resource 224, processor 320, memory 330, and/or the like) may utilize, during the dynamic malware analysis of the software program, the call graph to identify at least one of an exit of the software program, or a forced kill of the software program, as described above in connection with FIGS. 1A-2.

As further shown in FIG. 5, process 500 may include performing a static malware analysis of the software program based on identifying the at least one of the exit of the software program or the forced kill of the software program (block 550). For example, the security platform (e.g., using computing resource 224, processor 320, storage component 340, and/or the like) may perform a static malware analysis of the software program based on identifying the at least one of the exit of the software program or the forced kill of the software program, as described above in connection with FIGS. 1A-2.

As further shown in FIG. 5, process 500 may include generating static malware analysis results based on performing the static malware analysis of the software program (block 560). For example, the security platform (e.g., using computing resource 224, processor 320, memory 330, and/or the like) may generate static malware analysis results based on performing the static malware analysis of the software program, as described above in connection with FIGS. 1A-2.

As further shown in FIG. 5, process 500 may include combining the dynamic malware analysis results and the static malware analysis results to generate combined malware analysis results (block 570). For example, the security platform (e.g., using computing resource 224, processor 320, storage component 340, and/or the like) may combine the dynamic malware analysis results and the static malware analysis results to generate combined malware analysis results, as described above in connection with FIGS. 1A-2.

As further shown in FIG. 5, process 500 may include removing application programming interface (API) traces, provided in the combined malware analysis results, that are subsets of other API traces provided in the combined malware analysis results, wherein modified malware analysis results are generated based on removing the API traces that are subsets of other traces from the combined malware analysis results (block 580). For example, the security platform (e.g., using computing resource 224, processor 320, memory 330, and/or the like) may remove application programming interface (API) traces, provided in the combined malware analysis results, that are subsets of other API traces provided in the combined malware analysis results, as described above in connection with FIGS. 1A-2. In some implementations, modified malware analysis results may be generated based on removing the API traces that are subsets of other traces from the combined malware analysis results.

As further shown in FIG. 5, process 500 may include performing one or more actions based on the modified malware analysis results (block 590). For example, the security platform (e.g., using computing resource 224, processor 320, communication interface 370, and/or the like) may perform one or more actions based on the modified malware analysis results, as described above in connection with FIGS. 1A-2.

Process 500 may include additional implementations, such as any single implementation or any combination of implementations described below and/or in connection with one or more other processes described elsewhere herein.

In some implementations, the call graph may include one or more application programming interface (API) traces, and one or more function calls. In some implementations, when performing the one or more actions, the security platform may modify the software program to remove malicious code and to generate a modified software program, may provide the modified software program to the client device for execution, may reanalyze the software program to verify that the malicious code has been removed from the software program, and/or may remodify the software program to remove any remaining malicious code based on reanalyzing the software program.

In some implementations, when performing the one or more actions, the security platform may provide, to the client device, instructions that cause the client device to modify the software program to remove malicious code, may provide, to the client device, instructions that cause the client device to report the software program and the malicious code to particular devices, may report the software program and the malicious code to the particular devices, may prevent the software program and the malicious code from being executed on the particular devices that include the software program and the malicious code, and/or may remove the software program and malicious code from the particular devices that include the software program and the malicious code.

In some implementations, the security platform may analyze the dynamic malware analysis results to determine whether the dynamic malware analysis results are sufficient to identify malicious code in the software program, and may analyze the static malware analysis results to identify the malicious code in the software program when the dynamic malware analysis results are insufficient to identify the malicious code in the software program. In some implementations, the security platform may identify malicious code in the software program based on the modified malware analysis results. In some implementations, the dynamic malware analysis results may include information identifying one or more application programming interface (API) traces provided in the software program, and the static malware analysis results may include information identifying one or more additional API traces provided in the software program.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for extending dynamic detection of malware using static and dynamic malware analyses. In some implementations, one or more process blocks of FIG. 6 may be performed by a security platform (e.g., security platform 220). In some implementations, one or more process blocks of FIG. 6 may be performed by another device or a group of devices separate from or including the security platform, such as a client device (e.g., client device 210).

As shown in FIG. 6, process 600 may include receiving a software program from a client device (block 610). For example, the security platform (e.g., using computing resource 224, processor 320, communication interface 370, and/or the like) may receive a software program from a client device, as described above in connection with FIGS. 1A-2.

As further shown in FIG. 6, process 600 may include performing a dynamic malware analysis of the software program to generate dynamic malware analysis results, wherein the dynamic malware analysis results include information identifying one or more application programming interface (API) traces provided in the software program (block 620). For example, the security platform (e.g., using computing resource 224, processor 320, memory 330, and/or the like) may perform a dynamic malware analysis of the software program to generate dynamic malware analysis results, as described above in connection with FIGS. 1A-2. In some implementations, the dynamic malware analysis results may include information identifying one or more application programming interface (API) traces provided in the software program.

As further shown in FIG. 6, process 600 may include generating a call graph based on the dynamic malware analysis of the software program (block 630). For example, the security platform (e.g., using computing resource 224, processor 320, storage component 340, and/or the like) may generate a call graph based on the dynamic malware analysis of the software program, as described above in connection with FIGS. 1A-2.

As further shown in FIG. 6, process 600 may include utilizing, during the dynamic malware analysis of the software program, the call graph to identify at least one of an exit of the software program, or a forced kill of the software program (block 640). For example, the security platform (e.g., using computing resource 224, processor 320, memory 330, communication interface 370, and/or the like) may utilize, during the dynamic malware analysis of the software program, the call graph to identify at least one of an exit of the software program, or a forced kill of the software program, as described above in connection with FIGS. 1A-2.

As further shown in FIG. 6, process 600 may include performing a static malware analysis of the software program based on identifying the at least one of the exit of the software program or the forced kill of the software program (block 650). For example, the security platform (e.g., using computing resource 224, processor 320, storage component 340, communication interface 370, and/or the like) may perform a static malware analysis of the software program based on identifying the at least one of the exit of the software program or the forced kill of the software program, as described above in connection with FIGS. 1A-2.

As further shown in FIG. 6, process 600 may include generating static malware analysis results based on performing the static malware analysis of the software program, wherein the static malware analysis results include information identifying one or more additional API traces provided in the software program (block 660). For example, the security platform (e.g., using computing resource 224, processor 320, memory 330, and/or the like) may generate static malware analysis results based on performing the static malware analysis of the software program, as described above in connection with FIGS. 1A-2. In some implementations, the static malware analysis results may include information identifying one or more additional API traces provided in the software program.

As further shown in FIG. 6, process 600 may include combining the dynamic malware analysis results and the static malware analysis results to generate combined malware analysis results (block 670). For example, the security platform (e.g., using computing resource 224, processor 320, storage component 340, and/or the like) may combine the dynamic malware analysis results and the static malware analysis results to generate combined malware analysis results, as described above in connection with FIGS. 1A-2.

As further shown in FIG. 6, process 600 may include identifying malicious code in the software program based on the combined malware analysis results (block 680). For example, the security platform (e.g., using computing resource 224, processor 320, memory 330, and/or the like) may identify malicious code in the software program based on the combined malware analysis results, as described above in connection with FIGS. 1A-2.

As further shown in FIG. 6, process 600 may include performing one or more actions based on identifying the malicious code in the software program (block 690). For example, the security platform (e.g., using computing resource 224, processor 320, memory 330, communication interface 370, and/or the like) may perform one or more actions based on identifying the malicious code in the software program, as described above in connection with FIGS. 1A-2.

Process 600 may include additional implementations, such as any single implementation or any combination of implementations described below and/or in connection with one or more other processes described elsewhere herein.

In some implementations, the security platform may remove API traces, provided in the combined malware analysis results, that are subsets of other API traces provided in the combined malware analysis results. In some implementations, when performing the one or more actions, the security platform may modify the software program to remove malicious code and to generate a modified software program, may provide the modified software program to the client device for execution, may reanalyze the software program to verify that the malicious code has been removed from the software program, and/or may remodify the software program to remove any remaining malicious code based on reanalyzing the software program.

In some implementations, when performing the one or more actions, the security platform may provide, to the client device, instructions that cause the client device to modify the software program to remove malicious code, may provide, to the client device, instructions that cause the client device to report the software program and the malicious code to particular devices, may report the software program and the malicious code to the particular devices, may prevent the software program and the malicious code from being executed on the particular devices that include the software program and the malicious code, and/or may remove the software program and malicious code from the particular devices that include the software program and the malicious code.

In some implementations, when performing the dynamic malware analysis of the software program, the security platform may perform an API tracing of the software program via an API hooking mechanism, or may perform the API tracing of the software program via one or more dynamic instrumentation mechanisms. In some implementations, the security platform may analyze the dynamic malware analysis results to determine whether the dynamic malware analysis results are sufficient to identify the malicious code in the software program, and may analyze the static malware analysis results to identify the malicious code in the software program when the dynamic malware analysis results are insufficient to identify the malicious code in the software program.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a device, a software program from a client device,
        wherein the software program utilizes armoring techniques;
    providing, by the device, the software program to a sandbox;
    performing, by the device and via the sandbox, a dynamic malware analysis of the software program to generate dynamic malware analysis results;
    generating, by the device, a call graph based on the dynamic malware analysis of the software program;
    utilizing, by the device and during the dynamic malware analysis of the software program, the call graph to identify at least one of:
        an exit of the software program, or
        a forced kill of the software program;
    performing, by the device and via the sandbox, a static malware analysis of the software program based on identifying the at least one of the exit of the software program or the forced kill of the software program;
    generating, by the device, static malware analysis results based on performing the static malware analysis of the software program;
    analyzing, by the device, the dynamic malware analysis results to determine whether the dynamic malware analysis results are sufficient to identify malicious code in the software program;
    analyzing, by the device, the static malware analysis results to identify the malicious code in the software program when the dynamic malware analysis results are insufficient to identify the malicious code in the software program;
    combining, by the device, the dynamic malware analysis results and the static malware analysis results to generate combined malware analysis results;
    detecting, by the device, one or more application programming interface (API) traces for the software program based on the combined malware analysis results;
    determining, by the device and based on detecting the one or more API traces, one or more APIs that would have been called and logged had the software program not utilized armoring techniques; and
    performing, by the device, one or more actions based on determining the one or more APIs that would have been called and logged had the software program not utilized armoring techniques.

2. The method of claim 1, further comprising:
    removing one or more particular API traces, provided in the combined malware analysis results, that are subsets of the one or more API traces provided in the combined malware analysis results.

3. The method of claim 1, wherein performing the one or more actions comprises one or more of:
    modifying the software program to remove the malicious code and to generate a modified software program;
    providing the modified software program to the client device for execution;
    reanalyzing the software program to verify that the malicious code has been removed from the software program; or
    remodifying the software program to remove any remaining malicious code based on reanalyzing the software program.

4. The method of claim 1, wherein performing the one or more actions comprises one or more of:
    providing, to the client device, instructions that cause the client device to modify the software program to remove the malicious code;
    providing, to the client device, instructions that cause the client device to report the software program and the malicious code to particular devices;
    reporting the software program and the malicious code to the particular devices;
    preventing the software program and the malicious code from being executed on the particular devices that include the software program and the malicious code; or
    removing the software program and the malicious code from the particular devices that include the software program and the malicious code.

5. The method of claim 1, wherein performing the dynamic malware analysis of the software program comprises one of:
    performing an application programming interface (API) tracing of the software program via an API hooking mechanism; or
    performing the API tracing of the software program via one or more dynamic instrumentation mechanisms.

6. The method of claim 1, wherein performing the static malware analysis of the software program comprises:
    utilizing the call graph to perform the static malware analysis of the software program.

7. The method of claim 1, further comprising:
    identifying one or more malicious API traces in the combined malware analysis results based on at least one of:
        a list of known malicious API traces, or
        a machine learning model; and
    wherein performing the one or more actions comprises:
        performing the one or more actions based on identifying the one or more malicious API traces in the combined malware analysis results.

8. A device, comprising:
    one or more memories; and
    one or more processors to:
        receive a software program from a client device,
            wherein the software program utilizes armoring techniques;

perform a dynamic malware analysis of the software program to generate dynamic malware analysis results;
generate a call graph based on the dynamic malware analysis of the software program;
utilize, during the dynamic malware analysis of the software program, the call graph to identify at least one of:
an exit of the software program, or
a forced kill of the software program;
perform a static malware analysis of the software program based on identifying the at least one of the exit of the software program or the forced kill of the software program;
generate static malware analysis results based on performing the static malware analysis of the software program;
analyze the dynamic malware analysis results to determine whether the dynamic malware analysis results are sufficient to identify malicious code in the software program;
analyze the static malware analysis results to identify the malicious code in the software program when the dynamic malware analysis results are insufficient to identify the malicious code in the software program;
combine the dynamic malware analysis results and the static malware analysis results to generate combined malware analysis results;
detect one or more application programming interface (API) traces for the software program based on the combined malware analysis results;
determine, based on detecting the one or more API traces, one or more APIs that would have been called and logged had the software program not utilized armoring techniques;
remove, based on determining the one or more APIs that would have been called and logged had the software program not utilized armoring techniques, one or more particular API traces, provided in the combined malware analysis results, that are subsets of the one or more API traces provided in the combined malware analysis results,
wherein modified malware analysis results are generated based on removing the one or more particular API traces that are subsets of one or more API traces from the combined malware analysis results; and
perform one or more actions based on the modified malware analysis results.

9. The device of claim 8, wherein the call graph includes:
the one or more API traces, and
one or more function calls.

10. The device of claim 8, wherein, when performing the one or more actions, the one or more processors are to one or more of:
modify the software program to remove the malicious code and to generate a modified software program;
provide the modified software program to the client device for execution;
reanalyze the software program to verify that the malicious code has been removed from the software program; or
remodify the software program to remove any remaining malicious code based on reanalyzing the software program.

11. The device of claim 8, wherein, when performing the one or more actions, the one or more processors are to one or more of:
provide, to the client device, instructions that cause the client device to modify the software program to remove the malicious code;
provide, to the client device, instructions that cause the client device to report the software program and the malicious code to particular devices;
report the software program and the malicious code to the particular devices;
prevent the software program and the malicious code from being executed on the particular devices that include the software program and the malicious code; or
remove the software program and the malicious code from the particular devices that include the software program and the malicious code.

12. The device of claim 8, wherein the one or more processors are further to:
identify the malicious code in the software program based on the modified malware analysis results.

13. The device of claim 8, wherein the call graph includes one or more of:
addresses of call assembly instructions,
callee addresses, or
one or more jump commands.

14. The device of claim 8, wherein the one or more processors are further to:
label a function call of the call graph as an API.

15. A non-transitory computer-readable medium storing instructions, the instructions comprising:
one or more instructions that, when executed by one or more processors of a device, cause the one or more processors to:
receive a software program from a client device,
wherein the software program utilizes armoring techniques;
perform a dynamic malware analysis of the software program to generate dynamic malware analysis results,
wherein the dynamic malware analysis results include information identifying one or more application programming interface (API) traces provided in the software program;
generate a call graph based on the dynamic malware analysis of the software program;
utilize, during the dynamic malware analysis of the software program, the call graph to identify at least one of:
an exit of the software program, or
a forced kill of the software program;
perform a static malware analysis of the software program based on identifying the at least one of the exit of the software program or the forced kill of the software program;
generate static malware analysis results based on performing the static malware analysis of the software program,
wherein the static malware analysis results include information identifying one or more additional API traces provided in the software program;
analyze the dynamic malware analysis results to determine whether the dynamic malware analysis results are sufficient to identify malicious code in the software program;

analyze the static malware analysis results to identify the malicious code in the software program when the dynamic malware analysis results are insufficient to identify the malicious code in the software program;

combine the dynamic malware analysis results and the static malware analysis results to generate combined malware analysis results;

detect one or more application programming interface (API) traces for the software program based on the combined malware analysis results;

determine, based on detecting the one or more API traces, one or more APIs that would have been called and logged had the software program not utilized armoring techniques;

identify the malicious code in the software program based on determining the one or more APIs that would have been called and logged had the software program not utilized armoring techniques; and perform one or more actions based on identifying the malicious code in the software program.

16. The non-transitory computer-readable medium of claim 15, wherein the instructions further comprise:
one or more instructions that, when executed by the one or more processors, cause the one or more processors to:
remove one or more particular API traces, provided in the combined malware analysis results, that are subsets of the one or more API traces provided in the combined malware analysis results.

17. The non-transitory computer-readable medium of claim 15, wherein the one or more instructions, that cause the one or more processors to perform the one or more actions, cause the one or more processors to one or more of:
modify the software program to remove the malicious code and to generate a modified software program;
provide the modified software program to the client device for execution;
reanalyze the software program to verify that the malicious code has been removed from the software program; or
remodify the software program to remove any remaining malicious code based on reanalyzing the software program.

18. The non-transitory computer-readable medium of claim 15, wherein the one or more instructions, that cause the one or more processors to perform the one or more actions, cause the one or more processors to one or more of:
provide, to the client device, instructions that cause the client device to modify the software program to remove the malicious code;
provide, to the client device, instructions that cause the client device to report the software program and the malicious code to particular devices;
report the software program and the malicious code to the particular devices;
prevent the software program and the malicious code from being executed on the particular devices that include the software program and the malicious code; or
remove the software program and the malicious code from the particular devices that include the software program and the malicious code.

19. The non-transitory computer-readable medium of claim 15, wherein the one or more instructions, that cause the one or more processors to perform the dynamic malware analysis of the software program, cause the one or more processors to one of:
perform an API tracing of the software program via an API hooking mechanism; or
perform the API tracing of the software program via one or more dynamic instrumentation mechanisms.

20. The non-transitory computer-readable medium of claim 15, wherein the instructions further comprise:
one or more instructions that, when executed by the one or more processors, cause the one or more processors to:
label a function call of the call graph as an API.

* * * * *